INVENTOR
PIERRE F. DANEL
BY George H. Corey
ATTORNEY

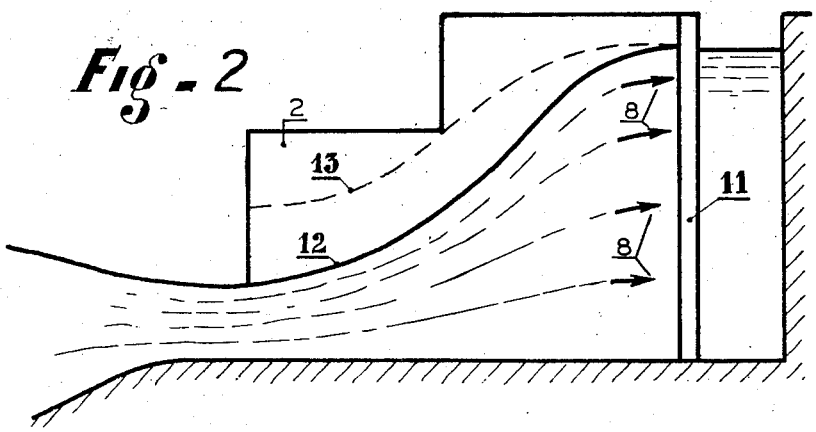
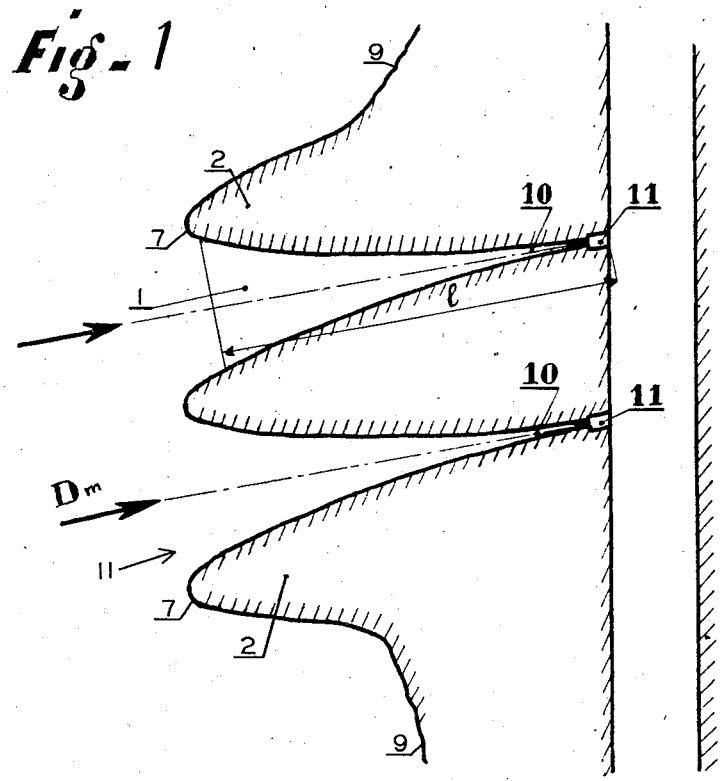

Feb. 10, 1948.   P. F. DANEL   2,435,576
CONCENTRATION CANAL OF INSTALLATIONS FOR RECOVERING ENERGY FROM SEA WAVES
Filed Oct. 12, 1945   3 Sheets-Sheet 3
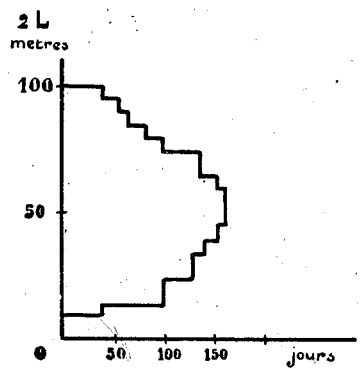
Fig. 6
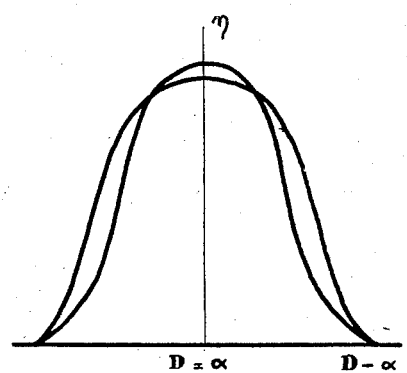
Fig. 7
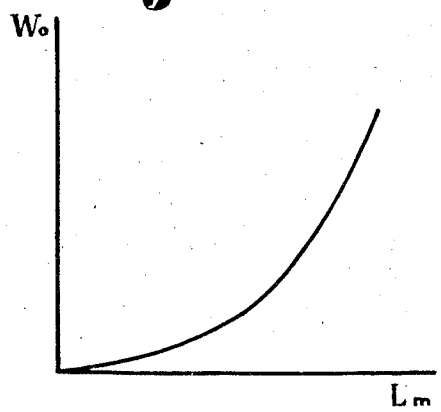
Fig. 8
Fig. 9
INVENTOR
PIERRE F. DANEL
BY George H. Corey
ATTORNEY Patented Feb. 10, 1948

2,435,576

UNITED STATES PATENT OFFICE 2,435,576

CONCENTRATION CANAL OF INSTALLATIONS FOR RECOVERING ENERGY FROM SEA WAVES

Pierre F. Danel, Grenoble, France, assignor to Ateliers Neyret-Beylier & Piccard-Pictet (Societe Anonyme), Grenoble, France Application October 12, 1945, Serial No. 622,034
In France June 20, 1945

12 Claims. (Cl. 61—20)

1

The present invention relates to installations for converting the energy of sea waves into an economically useful form and is more particularly concerned with installations of this character in which the energy of the waves is employed to create a head of water above mean sea level.

Sea wave installations of the general type with which the present invention is concerned comprise a concentration canal provided with outwardly diverging side walls forming a channel for receiving the waves from the sea and directing them inwardly. The waves enter the outer end of the channel and are increased in amplitude and velocity of propagation without breaking as they travel inwardly therein. At the landward end of the canal, the amplified waves impinge against an inlet gate through which water is forced by the motion of the wave. The inlet gate is so arranged as to conduct the water into a collecting flume or reservoir. One-way valves are provided in the inlet gate so that return flow of water from the reservoir is prevented, whereby the water accumulates in the reservoir to a height above the mean sea level.

The periodic energy of the incoming waves is thus absorbed and transformed into potential energy, stored in the head of water in the reservoir, which is then available for use at a uniform rate, for example, for the production of power by passing the water through turbines and returning it to the sea. The construction of prior installations of this character is disclosed in more detail in the co-pending application of Alphonse Gay, Serial No. 603,226, filed on July 4, 1945, and entitled "System utilizing the energy of the waves."

In the following discussion, in referring to sea waves, I intend primarily the regular swell of the sea, as contrasted with the smaller and less regular waves, since the characteristics of these more regular waves or swells are better understood and explanation of their behavior in the installation is simpler. It will be understood that installations constructed in accordance with the present invention are capable of recovering energy from the less regular waves, although the efficiency may be somewhat less when complex wave systems prevail.

In prior installations employing a concentration canal, the walls of the canal have been shaped to present approximately vertical working surfaces which were either plane or concave and which converged continuously up to the

2 inlet gate. When the walls of the canal are plane, or approximately so, and converge continuously up to the inlet gate, the water in the canal shows a tendency to splash or spout upwardly just before it reaches the gate, and, also, the direction of flow of the water immediately in front of the gate departs considerably from the horizontal toward the vertical direction.

In a constant angle channel, such as that which is formed by plane walls, the amplitude of a wave moving inwardly along the length of the channel varies nearly in inverse proportion to the change in width of the channel. When the walls converge continuously up to the inlet gate, so that the channel is very narrow immediately in front of the gate, the envelope of successive wave crests in the channel, as seen in vertical cross-section, appears as a portion of one branch of a hyperbola asymtotic to the vertical plane through the seaward face of the inlet gate. In other words, the locus of points representing the successive positions of a wave crest moving inwardly of the canal is very nearly a straight line for the greater part of the length of the canal but turns sharply upwardly in the vicinity of the inner end of the canal. The amplification theoretically would be infinite if the walls converged to a point. Actually, even with the walls separated at the inner end by the distance required by the inlet gate, the canal is sufficiently narrow at its inner end to produce a very considerable amplification. The result of this relationship is that the wave shows a sudden very great increase in amplitude at the extreme inner end of the canal, which accounts for the marked tendency of the water to splash or spout into the air just in front of the inlet gate, and also for the fact that the direction of flow of the water departs considerably from the horizontal toward the vertical direction immediately in front of the gate.

The energy which is dissipated in splashing or spouting cannot be recovered by the installation and is wasted. The energy represented by the upward component of the velocity of the water adjacent the gate constitutes a fraction of the entire energy contained in the waves which is largely lost, since motion of the water in an upward direction is ineffective to force water through the valves of the inlet gate.

Attempts have been made to overcome these drawbacks by placing a roof over the canal adjacent the inlet gate where the spouting occurs, but the roof does not remove the cause for the spouting and only acts to absorb and waste energy, through turbulence and other effects, as the jets or spouts strike the roof. It has also been sought to make use of the upward component of the water velocity by the provision of inclined guide vanes or nozzles disposed to change the direction of the water to a more nearly horizontal one before it reaches the valves of the inlet gate. This arrangement has the disadvantage of introducing a certain amount of frictional loss. Also, since the direction of motion of the water at any particular elevation will change from time to time with tidal and other changes in the water level, no inclination which the guide vanes or nozzles can be given will be perfectly adapted for the most efficient utilization of the water at every moment and, therefore, certain losses of energy are inherent in such a guide vane or nozzle system.

In these prior installations, the velocity of the water entering the inlet gate has been high so that the water continues to move after it enters the reservoir, creating strong currents or jets within the reservoir. The energy contained in these currents or jets performs no useful work and is wasted.

In these prior installations the duration of a wave impulse at the inlet gate has been short, that is, of the order of 1/20 of a complete wave cycle. Consequently there is considerable shock or impact effect at the inlet gate which leads to severe mechanical stresses in the structure and to pounding and vibration which accelerate deterioration of the structure. Also, the shorter the duration of the wave impulses, the greater the significance of the inertia of the valves and their resistance to opening movement, and, consequently, the larger the percentage of the energy of the waves which is reflected toward the open sea.

When the side walls of a concentration canal are concave, all of the foregoing disadvantageous effects are accentuated as contrasted with those produced by plane walls.

It will be appreciated from the foregoing that the concentration canal is an important element of the wave power installations under discussion and that the overall efficiency of such an installation will depend to a considerable extent on the effectiveness of the canal in presenting the waves to the inlet gate in such a form that their energy can be effectively utilized. The present invention consists in certain improvements in the shape, size and orientation of the concentration canal whereby the overall effectiveness of the installation is enhanced.

The present invention has as an object the provision of a concentration canal for sea wave power installations of improved efficiency as contrasted with those heretofore known.

A further object of the invention is to provide a concentration canal for sea wave power installations which will modify the amplitude and propagation velocity of the waves as they travel inwardly therein in a more desirable manner than the canals heretofore known.

A further object of the invention is to provide a concentration canal which will present the waves to the inlet gate in such a way as to cause them to yield a greater proportion of their energy than has heretofore been obtainable.

The present invention has as a further object an improvement of the shape and arrangement of the concentration canals whereby less energy is dissipated within the canal and lost through friction and reflection in passing into the reservoir.

A further object of the invention is to provide a concentration canal which will present the waves to the inlet gate in a form tending to a more nearly continuous production of energy at this point.

A further object of the invention is to provide a concentration canal which will effectively increase the amplitude and propagation velocity of the waves and yet present them to the inlet gate in such a way that the water throughout the depth of the wave is travelling in a more nearly uniform and horizontal direction and the velocities in the different portions of the depth of the wave become more nearly uniform.

A further object of the invention is to provide a concentration canal which will give an increased yield of energy from the waves with less shock or impact effect of the waves at the inlet gate.

A further object of the invention is to provide a concentration canal in which the tendency of the water to splash or spout upwardly at the gate is suppressed.

A still further object of the invention is to so form the canal as to size and proportions, and so orient the wave power installation with respect to the coastline and oceanographic characteristics of the locality, as most effectively to utilize the wave energy available in the sea at the site of the installation.

In accordance with the invention, I have found that much better conditions for the conversion of the energy in the waves will obtain if the amplifying effect of the canal near its inner end, for a short extent in front of the inlet gate, is reduced as compared with the rate of amplification in the main part of the channel. In accordance with my invention, the walls of the concentrating canal are made plane, or slightly convex, and shaped to converge over the greater part of their length at the outer end of the canal, but for a short extent in front of the gate the canal walls are disposed parallel to each other, or very nearly so.

The result of giving the canal walls such a shape is to produce a sufficient amplification of the incoming wave before the wave reaches the inner part of the canal. Then, in the last part of its course, as the wave travels through the part of the canal whose walls are parallel or nearly so, the wave is not amplified further and its upper surface is flattened just before it reaches the inlet gate. The length of the parallel—or nearly parallel—walled portion of the canal should be such that the direction of motion of the water at the free surface becomes approximately horizontal before it reaches the gate. As a consequence of the flattening of the waves before they arrive at the inlet gate, the tendency to splashing or spouting of the water is substantially suppressed. When the canal of the present invention is employed devices for guiding the water to prevent spouting may be dispensed with, or, if they are employed, their guiding effect on the water is so reduced that they introduce only negligible losses of energy. By constructing the canal in the above manner it is also found that the water is presented to the gate throughout the depth of the water moved through the canal toward the gate more nearly horizontally and thus disposed in the attitude which is most effective for opening the valves and forcing water into the reservoir.

A further result of flattening the wave as it reaches the inlet gate is to increase the duration of each wave impulse so that it extends over a greater proportion of the entire wave cycle. When the canal walls for a short extent in front of the inlet gate are made approximately parallel, a wave impulse at the gate will be some four or five times longer than it would be if the convergence of the walls continued up to the gate. This greater relative duration of the wave impulse has a substantial beneficial influence on the yield of energy which may be obtained from the waves. The inlet valves therefore remain open during a much greater proportion of the wave cycle, which permits these structures to have greater inertia and a more substantial construction and also a larger water passage area. As a consequence the losses of energy by reflection and by friction are substantially reduced. Also, the velocity of the water entering the reservoir is lowered, so that less energy is consumed in merely creating currents within the reservoir. As a further result of the relatively greater duration of the wave impulses the impact stresses in the structure are reduced and the structure will therefore better withstand the pounding of the sea. With the construction of the present invention the flow of water into the canal becomes more nearly continuous and uniform and the fluctuations in the periodic conversion of the wave power energy at the inlet gate are smoothed out, so that all of the losses at this point are diminished.

It is a further feature of my invention to increase the efficiency of the canals by giving them an orientation and a size which are calculated to utilize to the best advantage the wave energy developed by the prevailing waves of the locality.

The waves which are primarily of interest in the present connection are those which are formed by a steady wind over an adequate reach. The waves thus started eventually form regular undulations which continue after the wind has died down and become more regular as they slowly diminish in strength. Waves of this character are sometimes referred to as swells. The significant characteristics of these waves are their direction, their amplitude, their wave length and their velocity. The velocity is a function of the wave length, as well as of the amplitude. In a given locality these characteristics will vary from season to season, but modern hydrographic studies make it possible to know the regimen of the sea at any locality just as thoroughly as the regimen of a river may be known.

In accordance with the present invention the installation is so oriented and of such dimensions as to give the best yield of energy having regard to the characteristics of the waves of the locality and is particularly adapted to a certain preselected regimen in order to attain the maximum efficiency. No installation can utilize all of the differing types of waves with an equal efficiency. It is therefore important to find out the characteristics of the waves at the contemplated locality which will be the most useful.

I have found that the waves at any locality may be classified into groups in accordance with their amplitude and that the waves of one of these groups will, in general, be the most useful for the present purpose. For example, representative waves in the Western Mediterranean may be classified as follows:

(1) Waves whose amplitude is less than one meter (or of wave length of less than about 16 meters). Waves of this class are too small to be useful. They are disregarded in designing the installation because they are of insufficient economic interest.

(2) Waves of amplitude between 1 meter and 4 meters (or of a wave length of about 60 meters). These are the most useful waves and the calculation of the installation is based on them.

(3) Heavy sea waves of amplitude above 4 meters. These are too infrequent to significantly influence the design. Their energy is so great that it is not feasible to employ it.

This classification may vary with the locality and with the economic considerations imposed. For example, the range of class 2 may be much narrower than that given above. The principle, however, remains invariable.

In its preferred embodiment, therefore, the installation is so oriented and proportioned as to give the greatest efficiency with the most useful waves and to allow the others to contribute as much energy as they can. In accordance with this aspect of the invention the canal is directed so that its longitudinal axis extends approximately in the direction from which the most useful waves reach the installation from the sea. Also the effective length of the channel is preferably made about one-half the wave length of these most useful waves. The canal depth must be sufficient to avoid breaking of the waves in the canal and to prevent formation of obnoxious standing waves, or chop, in the canal.

I have found that for the most effective results the shore on each side of the installation should be one which reflects but little of the energy of the incoming waves, i. e., which absorbs the energy of these waves. Straight coastlines disposed normally to the direction of travel of the most useful waves are the best from this point of view. In front of the entries to the canals, the depth of the water and the nature of the bottom should preferably be such as not to alter the incoming waves. It is also important that the structural parts of the installation lying between two contiguous canals should produce the least possible reflection and alteration of the waves. Also, the parts of the installation which join an outside wall of the canal to the shore line should not alter the waves, and to this end, they may be set back or may be made so that they are highly absorbent, and not reflective, of the wave energy.

The invention will be better understood from the following description of various particular forms in which it may be embodied and from the accompanying drawings, in which:

Fig. 1 is a plan view of a sea wave power installation constructed in accordance with the invention;

Fig. 2 is a vertical mid section of one of the canals of the installation shown in Fig. 1;

Fig. 6 is a graph based on assumed hydrographic data showing the relationship between waves of different lengths and the seasonal frequency of their occurrence for a given locality;

Figs. 7, 8 and 9 illustrate a method by which the characteristics of the most useful waves may be calculated.

Figure 3:
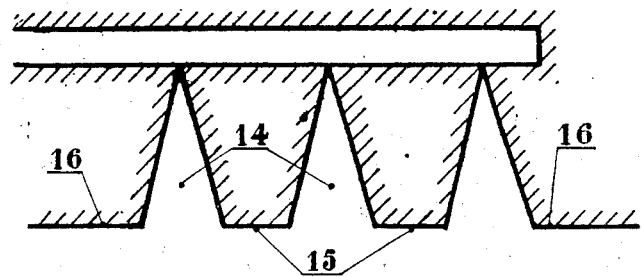
Fig. 3 is a plan view showing constructional features which are to be avoided.

Referring to the drawings, Fig. 1 shows two contiguous canals 1 which are formed and arranged in accordance with the present invention. The walls forming the channels of the canals are approximately vertical and are curved so that they are convex at the outer end of the canal, less sharply curved in the successive intermediate parts of the canal and of a very slight degree of convergence at the innermost part 10 of the canal over a short extent immediately in front of the inlet gate 11. In the part 10, lying in front of the inlet gate, the side walls of the canal may be approximately parallel to each other. It is not essential that the walls should be curved throughout their entire extent; they may be plane for short distances but should not be concave at any point. The walls should be smoothly continuous and without sudden variations in curvature.

The curvature of the canal walls need not be exactly that shown in the drawing. Any convex shape will serve to amplify the wave and increase its velocity of propagation as it travels inwardly of the canal, in accordance with the invention, provided that the walls for a short extent 10 in front of the inlet gate 11 are so shaped that substantially no amplifying effect is exerted on the wave at this point and that the angle of the wall with the axis of the canal at the mouth of the canal is less than about 30° except for a very short distance at the tip which may be shaped to present a blunt pointed end 7 to the sea. The walls, as seen in plan, also may have the shape of a logarithmic curve or the shape of a hyperbola. In the latter case the amplification of a wave travelling inwardly of the canal is theoretically linear.

When two or more canals are located side by side the walls of two adjacent canals which meet at the seaward end of the canal may be shaped to present a blunted point 7 to the sea to offer a greater resistance to the destructive action of the waves. The parts of the canal of different characteristics are joined to each other by continuous hydrodynamic curves.

The structure 2 forming the walls of the canal may be of solid or of a hollow construction. These structures have a massive shape as shown which is well adapted to resist heavy seas.

The best sizes and proportions to give to the channels will depend upon the head of water desired to be impounded in the reservoir and upon the range of wave lengths to be utilized. Whatever the size and proportions of the canal and whatever the width of the inlet gate 11, however, the canal will always be provided with a section 10 extending a short distance in front of the inlet gate 11 in which the angle between the canal walls is small so that the waves are not substantially increased in amplitude as they pass through this section. The greater the length of the section 10 the more will the waves be flattened and the direction of motion of the water be brought to a horizontal direction before it is directed against the inlet gate.

In order to insure the best results, the length $l$ of the working part of the channel (Fig. 1) is made approximately one-half the length of the most useful waves of the locality. The length $l$ of the canal may depart somewhat from the theoretical one-half the length of the most useful wave. For example, when the shore is very steep, economic considerations may suggest or require the use of canals somewhat shorter than the preferred theoretical length.

Fig. 2 illustrates the effect on the waves of canal walls formed in accordance with the present invention. The line 12 indicates the surface of a wave whose crest has arrived at the inlet gate 11. It will be noted that the wave has flattened out and that the direction of the motion of the water in the wave, indicated by the arrows 8, is approximately horizontal and thus directed for the most effective action on the check valves of the inlet gate. In view of this flattening of the wave as it reaches the inlet gate 11, the tendency to splashing or spouting of the water in front of the gate is very substantially reduced. The dotted line 13 is the locus of successive positions of the wave crest as it travels inwardly of the canal. It will be observed from the shape of this line that the amplitude of the wave is increased rapidly after it enters the canal and that this amplification continues until the wave crest reaches a point a short distance in front of the inlet gate 11, at which point section 10 of the canal which has substantially parallel walls begins. In section 10 the amplitude of the wave is not increased substantially or at all so that the wave flattens out and approaches the inlet gate 11 in a nearly horizontal direction.

With a canal shaped in accordance with the invention there can be obtained the desired amount of overall increase in amplitude of the waves, since the inclination of the walls varies smoothly and progressively from the outer almost to the inner end of the canal, and at the same time the sharp amplification immediately in front of the inlet gate, which leads to splashing and spouting, can be avoided.

In Fig. 1 the channels are oriented so that their axis extend in the direction $D_m$ of the most useful waves of the locality. This orientation may lead as shown to a certain obliquity of the canal axis with respect to the coast line. The structure 2 is given a certain alteration in shape to correspond to this obliquity and thus becomes slightly asymmetrical at its outer end. This asymmetry slightly decreases the overall efficiency of the installation and, if the direction $D_m$ is markedly oblique to the coast line, a compromise must be made between this decrease in efficiency and the increase in efficiency which can be obtained by disposing the canal axis in the direction $D_m$. This compromise may be effected by disposing the channels in a direction lying between $D_m$ and the perpendicular to the coast line.

Instead of setting all the canals oblique to the coast line with their tips lying in a line parallel to the coast line, the canals may be arranged in groups so that all the groups face in the direction $D_m$ and the tips in each group lie along a line perpendicular to $D_m$. In this case the groups will be stepped so that all of the canals may be of approximately the same length. The parts of the structure 2 lying between and joining adjacent groups must be as absorbent as possible to prevent reflections which might disturb the waves coming into the canals. For the same reason care must be given to the proper shaping of the parts of the structure on the outside of the channel which join the coast line. This part of the canal wall may be set back as indicated at 9 in Fig. 1, if the shore is reflective. If the shore is highly absorbent this inner joining part of the structure is of less importance. Absorbent shores are, for example, those which have a gradual slope which causes the waves to break, and rocky or undulant coast lines where the energy of the waves is diffused.

To better illustrate the principles of the invention there is shown in Fig. 3 an installation which is so constructed as to show several of the faults which are avoided by installations formed in accordance with the invention. In this installation the channels 14 have plane walls throughout their length which converge continuously up to the inlet gate. The walls of the individual channels 14 are connected by plane walls 15 parallel to the incoming wave fronts. In addition, the canals are joined to the adjacent shore by plane vertical walls 16 and all of these walls meet at sharp angles instead of merging gradually one into the other. Such an arrangement would seriously interfere with a proper propagation of the waves in the canals. Standing, or chopping waves would be formed in front of the canals with the result that only a small amount of energy would get into the canals and even less into the reservoir.

Figure 4:
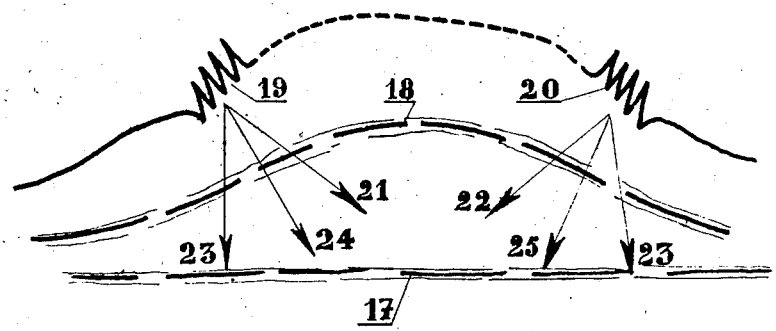
Fig. 4 is a plan view showing a preferred orientation of installations located in a bay.

In some localities the orientation of the canal in the direction of the most useful waves, $D_m$, would not produce enough output. This would be the case in locations where the direction of the waves in one season is very different from their direction in another season and also where the direction of the waves differs substantially from one place to another in the same locality. Figure 4 illustrates the orientation of an installation under these conditions, which in this case is an installation in a bay. The sea waves 17 reaching the bay have a straight front. As a wave enters the bay its front is bent as indicated at 18, into a position intermediate the shape of the coast line of the bay and the original straight front position of the wave indicated at 17. The installations are indicated at 19 and 20. To make the most effective utilization of the energy of the waves 18, the canals of the installations 19 and 20 are preferably not directed in the direction 21 and 22 normal to the coast or in the direction 23 perpendicular to the wave front 17 but in the intermediate directions 24 and 25 of the waves near the shore.

Figure 5:
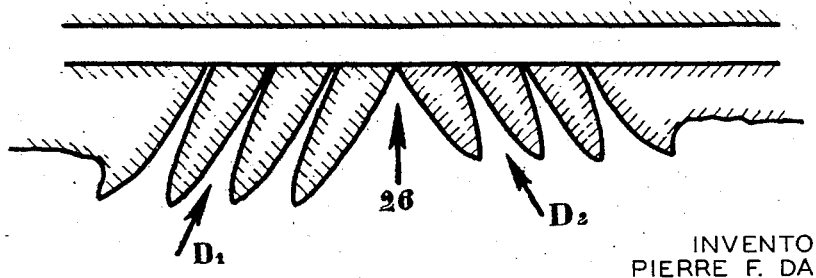
Fig. 5 is a plan view illustrating a modified orientation of an installation.

In some cases it will be found that the most useful waves come predominantly from two directions. In this case the installation may be constructed to provide two groups of canals, one group directed as illustrated in Fig. 5 to most effectively utilize the waves from one direction $D_1$ and the other group disposed to utilize the waves from the other direction $D_2$. If the characteristics of the waves from the two directions, other than their direction, are different, the channels of the two groups may be constructed with correspondingly different lengths and with different curvatures. The canals of the two groups may be joined by an intermediate canal which, because of the unfavorable angle between its walls, will show a lower efficiency or else the two groups may be built independently and separated by a stretch of shore line which preferably is selected to be highly absorbent of incoming waves. In some cases the two groups of canals may advantageously be disposed on opposite sides of a cape.

The determination of the characteristic length and direction of the most useful waves for the purpose of designing the canals to suit these waves may be made in various ways. One simple method of calculation consists in constructing a chart such as that shown in Fig. 6 in which the wave lengths of various classes of waves are plotted as ordinates and the number of days in a year on which waves of each frequency occur is plotted as abscissae. Then, from an inspection of this chart, the characteristics of waves which show the most frequent occurrence may be selected by inspection. However, the choice of the most useful waves by this method is sometimes difficult and the most effective utilization of the waves is not assured. It is for this reason that the invention contemplates departures of the length of the canal on both sides of the half length of the most useful wave to accommodate particular shore shapes or to avoid excessive construction costs. The departure in the length of the canal from the half length of the most useful wave for these purposes may safely be greater in cases where the characteristics of the most useful wave for the locality are roughly computed.

A general method for computing the characteristics of the most useful waves of a locality will be given below. This method enables the determination of the size and orientation of the concentrating canals for the best results for a given locality to be made with as much accuracy as is wanted.

First of all, the depth of the canal is largely determined by the necessity of avoiding breaking of the waves in the canal, of avoiding the formation of undesirable wave motions such as choppy waves and by the controlling economic conditions.

From the chart of wave length distribution of Fig. 6 the general range of the most useful waves is roughly chosen. The canal shape will be determined largely by the head desired to be impounded, since the head depends upon the wave amplitude at the gate and the amplitude in turn upon the amplification of the wave in the channel. For waves reaching the installation in the direction of the canal axis the efficiency of any particular canal shape is substantially independent of the wave length (or amplitude) within a reasonable range of wave lengths. This efficiency will vary with the head but within a reasonable range of heads will remain at a satisfactorily high value. When the shape of the channel is varied, particularly the angle between its walls, the optimum head may be varied as well as the efficiency value. I have found that when the wave length range has been chosen, there is a certain canal shape which will give a maximum efficiency, corresponding to a certain head. In accordance with the invention, the installation is designed for this head and the canal accordingly is given the shape corresponding to this head. Accordingly after a few preliminary trials, it is possible to limit the number of possible canal shapes to a few.

Two methods of approach are available together with various combinations of each. In the first method the impounded head is kept constant. This is theoretically the more advantageous because the efficiency of the installation is then kept at a maximum. However, the output will vary widely with changes in sea conditions and the devices which are employed to utilize the power produced by the installation, such as turbines, must be adapted to this wide variation.

In the second method the head of the impounded water may be allowed to vary over a considerable range. This method may be employed when the installations include a reservoir or when consuming equipment is not adapted to utilize widely varying outputs. In installations of this type, when the power furnished by the waves is greater than can be consumed, water may be allowed to overflow or other adjustments made to permit an equilibrium to be established between the power consumed and the power supplied. Installations of this type may be arranged to provide a reserve of energy which can be drawn upon in periods when the power available from the sea is low.

As it is impossible to forecast the actual power of the waves at any given moment, except very roughly season by season, the computation may be made more advantageously on the basis of a constant head. Installations so designed may, of course, be operated as indicated under the second method above, in which case the total annual energy provided will be less than if the head had been kept constant at the optimum value, but this annual output will, nevertheless, be greater than if a different head had been chosen, since the efficiency corresponding to each head is practically independent of the wave lengths.

The head having been decided upon the shape and proportions of the canals are determined. Economic considerations may require that the canal shape and size depart somewhat from the shape and size corresponding to the chosen head, but these canal characteristics will be determined primarily by the head decided upon.

The power, W, which a canal will yield depends on five main factors or values:

1. The wave length (or amplitude) 2L.
2. The direction of the waves D.
3. The direction of the channel $\alpha$.
4. The length of the channel $l$.
5. A co-efficient Y representing the effect of the shape of the walls. Thus $W = f(L, D, l, \alpha, Y)$.

Since the first two factors vary seasonally, the energy U impounded over a period of a year may be expressed by the equation $$U = \int_0^{365} W dt$$

The problem then may be stated to be to find the values of $l$, $\alpha$ and Y which give a maximum value for U. If it is desired to obtain the greatest power production during some particular season the calculation will be made for this season rather than for the entire year in the same manner.

The shape co-efficient Y is, of course, only a manner of speaking; as a practical matter, a number of typical shapes may drawn on paper and investigated experimentally by the use of small scale models.

A value for W is obtained by a method of successive approximations. Values are chosen for $l$, $\alpha$ and Y by inspection to correspond as nearly as possible with the most frequently occurring waves as in the first empirical method described above, employing the chart of Fig. 6. The power for each class of waves is then multiplied by the total time during which these waves occur in a year. All of these outputs are then added together which gives the total annual output U. The computation is then made with other assumed values of $l$, $\alpha$ and Y until a set of values for $l$, $\alpha$ and Y is found which will give the maximum value for U.

The calculation of W for a set of values of $l$, $\alpha$ and Y may be made as follows:

First the waves are classified as to direction in a small number of sectors, each sector being narrow enough so that the efficiencies of waves from all the directions within the sector are substantially the same. For the purpose of illustration four such sectors may be assumed, having main directions $D_1$, $D_2$, $D_3$, $D_4$.

A chart similar to Fig. 6 is then constructed for each sector.

Since the head is already determined, the few different canal shapes which will supply this head are selected and efficiency curves drawn for each as illustrated in Fig. 7 in which the ordinates represent efficiencies and the abscissae directions. From this set of curves will be selected the one which gives the characteristics which are preferable for the particular installation.

A further chart, Fig. 8, is constructed giving as ordinates the power $W_0$ of the waves in terms of their wave length $L_m$ as abscissae.

Then a table, Fig. 9, is prepared containing four lines $D_1$, $D_2$, $D_3$, $D_4$, one for each sector selected, and as many columns as there are classified wave lengths, from Fig. 6. In each space of this table is written the corresponding energy U. For example, to fill the space $L_1$, $D_1$, the energy U corresponding to the wave length $L_1$ obtained from the curve of Fig. 8 is multiplied by the total time during which waves of length $L_1$ occur taken from the chart of Fig. 10 and the product is multiplied by the efficiency from Fig. 7 for the direction $D_1$. The energy for all of the waves for each of the four directions is similarly computed and entered in the table, Fig. 9. When this table is completed all of the entries are added together and their sum is a value of U.

Other similar tables are made for other assumed values of $l$, $\alpha$ and Y. Values of $l$, $\alpha$ and Y are assumed which from inspection apparently will give a greater value for U than the values previously assumed for $l$, $\alpha$ and Y. The maximum value of U may be thus determined as precisely as desired. The values of $l$, $\alpha$ and Y which correspond to this maximum value of U are the characteristics of the wave which should be adopted. The most useful waves then are those which have a wave length $2L_m = 2l$ and a direction $D_m = \alpha$. The length of the canal will then be made as near to $L_m$ as can conveniently be done, considering the conformation of the shore at the locality and the economics of construction, and will be oriented so that its axis is disposed in the direction $D_m$.

When an arrangement of canals like those illustrated in Fig. 5 is employed, the entire computation is carried out for each group independently.

Local conditions will, of course, influence the final decision to some extent. For example, if the shore line is sharply inclined to the direction $D_m$, it may be desirable to position the canal so that its axis departs somewhat from the direction $D_m$. If the shore is very steep, the canals may be made somewhat shorter than the length $L_m$.

I claim:

1. In an installation for converting the energy of sea waves into an economically useful form, the combination of a concentration canal opening toward the sea and forming a channel for receiving the waves and increasing their amplitude and propagation velocity as they move inwardly therein, a reservoir at the inner end of the channel for receiving water therefrom, and an inlet gate between the channel and the reservoir for admitting water moved by the waves into the reservoir and preventing return flow from the reservoir to the channel, said concentration canal being defined by laterally spaced upright side walls presenting channel-defining surfaces which continuously converge inwardly from the seaward end of said canal throughout the major portion of the length thereof and which throughout the remaining portion of the length thereof extend in substantially parallel relation, said substantially parallel portion being of sufficient length to insure that the waves in passing inwardly from said major portion shall have attained a substantially constant amplitude before arriving at said inlet gate.

2. In an installation for converting the energy of sea waves into an economically useful form which includes a concentration canal opening toward the sea and forming a channel for receiving the waves and increasing their amplitude and propagation velocity as they move inwardly therein, a reservoir at the inner end of the channel and an inlet gate between the channel and the reservoir for admitting water moved by the waves into the reservoir and preventing return flow from the reservoir to the channel, an improved concentration canal having laterally spaced upright side walls presenting channel-defining surfaces which are convex inwardly at all points up to a point a short distance in advance of the inlet gate and from this point toward the inlet gate are substantially parallel, said parallel-walled section of said canal being of sufficient length to cause waves moving inwardly thereinto toward said gate to substantially flatten out and flow through said inlet gate in a substantially horizontal direction.

3. In an installation for converting the energy of sea waves into an economically useful form which includes a concentration canal opening toward the sea and forming a channel for receiving the waves and increasing their amplitude and propagation velocity as they move inwardly therein, a reservoir at the inner end of the channel for receiving water therefrom, and an inlet gate between the channel and the reservoir for admitting water moved by the waves into the reservoir and preventing return flow from the reservoir to the channel, an improved concentration canal having two spaced upright side walls presenting channel defining surfaces which converge at a continuously decreasing rate from their outer toward their inner ends and which for a short distance in front of the inlet gate are substantially parallel, whereby waves entering the canal from the sea first increase in amplitude as they move inwardly therein and then flatten out before they reach the inlet gate.

4. In an installation for converting the energy of sea waves into an economically useful form which includes a concentration canal opening toward the sea and forming a channel for receiving the waves and increasing their amplitude and propagation velocity as they move inwardly therein, a reservoir at the inner end of the channel for receiving water therefrom, and an inlet gate between the channel and the reservoir for admitting water moved by the waves into the reservoir and preventing return flow from the reservoir to the channel, an improved concentration canal having laterally spaced upright side walls presenting channel-defining surfaces which continuously converge inwardly from the seaward end of said canal throughout the major portion of the length thereof in the shape, as seen in horizontal section, of like exponential curves, and which throughout the remaining portion of the length of said canal extend in substantially parallel relation, said remaining portion being of sufficient length to insure that the waves in passing inwardly from said major portion shall have attained a substantially constant amplitude before arriving at said inlet gate.

5. An installation as defined in claim 1 wherein the angle of convergence of the side walls adjacent the outer, seaward, end of the concentration canal does not exceed 30° and progressively decreases inwardly toward said inlet gate.

6. An installation as defined in claim 1 wherein the concentration canal has a length approximating one-half the average length of the most utilizable waves available at the installation site, the maximum angle of convergence of the side wall portions of said canal does not exceed 30°, and the inner substantially parallel side wall surfaces are connected to the converging side wall portions by smooth inwardly curved convex wall surfaces.

7. An installation as defined in claim 1 wherein the concentration canal is so oriented that its longitudinal axis extends in the direction from which the most utilizable sea waves reach the canal.

8. An installation as defined in claim 1 wherein the length of the concentration canal from its outer end to the inlet gate is approximately one-half the average length of the most utilizable waves available at the installation site.

9. An installation as defined in claim 1 wherein the concentration canals are disposed between shores on opposite sides thereof which are highly absorbent of incoming sea waves, whereby reflective disturbances of the water of the incoming waves is minimized.

10. An installation as defined in claim 1, wherein the most utilizable waves approach the shore line at the site of the installation at an oblique angle to the shore line and the concentration canal is so oriented that its longitudinal axis extends in a direction intermediate the direction from which the most utilizable wave arrives at the canal and perpendicular to the shore line at the location of said installation.

11. An installation as defined in claim 1 wherein the structural parts of the installation which lie outside the concentration canal on the seaward side of said installation are so shaped and positioned as to be highly absorbent of the sea waves which strike against them.

12. An installation as defined in claim 1 wherein a plurality of groups of concentration canals are arranged in adjacent relation along a coast line that is approached by utilizable waves from a plurality of directions and wherein said groups of concentration canals are respectively oriented so that their longitudinal axes extend in the directions from which the respective most useful waves arrive, and wherein the water impounded through said respective groups of concentration canals is led to a common storage reservoir for subsequent use.

PIERRE F. DANEL.

REFERENCES CITED

The following references are of record in the file of this patent:

UNITED STATES PATENTS

| Number | Name | Date |
|---|---|---|
| 984,131 | Gammons | Feb. 14, 1911 |
| 1,338,326 | Peck | Apr. 27, 1920 |

FOREIGN PATENTS

| Number | Country | Date |
|---|---|---|
| 25,964 | France | 1923 |
| 586,091 | France | 1924 |